US008566442B2

(12) United States Patent
Jiang et al.

(10) Patent No.: US 8,566,442 B2
(45) Date of Patent: Oct. 22, 2013

(54) TEST ENVIRONMENT FOR AUDIO/VIDEO PLAYBACK

(75) Inventors: Ming Jiang, Santa Clara, CA (US); Jao Tham, Santa Clara, CA (US); Devraj Chitnis, San Jose, CA (US); Gautam Kotwal, Sunnyvale, CA (US)

(73) Assignee: Netflix, Inc., Los Gatos, CA (US)

( * ) Notice: Subject to any disclaimer, the term of this patent is extended or adjusted under 35 U.S.C. 154(b) by 111 days.

(21) Appl. No.: 13/023,438

(22) Filed: Feb. 8, 2011

(65) Prior Publication Data

US 2012/0203891 A1 Aug. 9, 2012

(51) Int. Cl.
*G06F 15/173* (2006.01)

(52) U.S. Cl.
USPC .......................................................... 709/224

(58) Field of Classification Search
USPC ......... 714/43, 37; 386/46; 725/132; 709/206, 709/224
See application file for complete search history.

(56) References Cited

U.S. PATENT DOCUMENTS

| 8,230,264 B2 * | 7/2012 | Shigeta et al. ................. 714/37 |
| 2009/0182815 A1 * | 7/2009 | Czechowski et al. ......... 709/206 |
| 2011/0065503 A1 * | 3/2011 | Wolff-Petersen et al. ...... 463/31 |
| 2011/0107152 A1 * | 5/2011 | Adams ........................... 714/43 |

* cited by examiner

*Primary Examiner* — Benjamin R Bruckart
*Assistant Examiner* — Karina J Garcia-Ching
(74) *Attorney, Agent, or Firm* — Patterson & Sheridan, L.L.P.

(57) ABSTRACT

One embodiment of the present invention sets forth a technique for testing a client for audio/video/subtitle playback capabilities. A computing device is configured to receive a virtual machine data file that includes an operating system, a web server, a content playback application, and a test program. The virtual machine data file is executed to cause the operating system and web server to initialize. The web server detects a communications connection to the client, transmits the content playback application to the client for execution, and transmits one or more tests included in the test program to test the audio/video playback capabilities of the client. The computing device is further configured to receive, from the client via the web server, test results associated with the one or more tests, and to store the test results in a memory.

20 Claims, 6 Drawing Sheets

Figure 5

TEST ENVIRONMENT FOR AUDIO/VIDEO PLAYBACK

BACKGROUND OF THE INVENTION

1. Field of the Invention

Embodiments of the present invention relate generally to digital media and, more specifically, to testing digital content players for compatibility with a set of standards.

2. Description of the Related Art

Digital content distribution systems conventionally include a content server, a content player (also referred to herein as a "client"), and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof. The content player is configured to download and play a digital content file, in response to a user request selecting the title for playback. Playback typically involves a technique known in the art as "streaming," whereby the content server sequentially transmits the digital content file to the content player, and the content player plays the digital content file while content data is received that comprises the digital content file. Importantly, proper playback of digital content files requires that both the content server and the content player operate according to a set of standards.

Typically, a small number of content servers provide the digital content files to a large number of content players that are manufactured using various hardware and software platforms, e.g., television systems, cable box systems, and video game systems. To maintain uniform functionality across these various content players, manufacturers are often required to certify that their device is compatible with the set of standards before being sold to consumers. However, proving compatibility requires rigorous testing of the content player and, further, requires high-bandwidth internet access that is often expensive, e.g., in areas where internet availability is scarce. For example, if one standard requires that the content player avoids memory overflows, an effective test is to stream large amounts of content, e.g., hundreds of full-length movies, to the content player.

As the foregoing illustrates, what is needed in the art is an efficient approach for testing compatibility of a content player with one or more standards.

SUMMARY OF THE INVENTION

One embodiment of the present invention sets forth a technique for testing a client for audio/video playback capabilities and all communications between server and client. The method includes the steps of receiving a virtual machine data file that includes an operating system, a network manager, a web server, a content playback application, a GUI for test selection, network management, a logging and result reporting mechanism, and a test program to be loaded on the device. The virtual machine data file is executed to cause the operating system and web server to initialize. The web server detects a communications connection to the content player, transmits the content playback application to the content player for execution, and transmits one or more tests included in the test program to test the audio/video/subtitle playback capabilities of the client, communication protocols, and pre-defined specifications. The computing device is further configured to receive, from the content player via the web server, test results associated with the one or more tests, and to store the test results in a memory.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a content player testing configuration interface, according to one embodiment of the invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
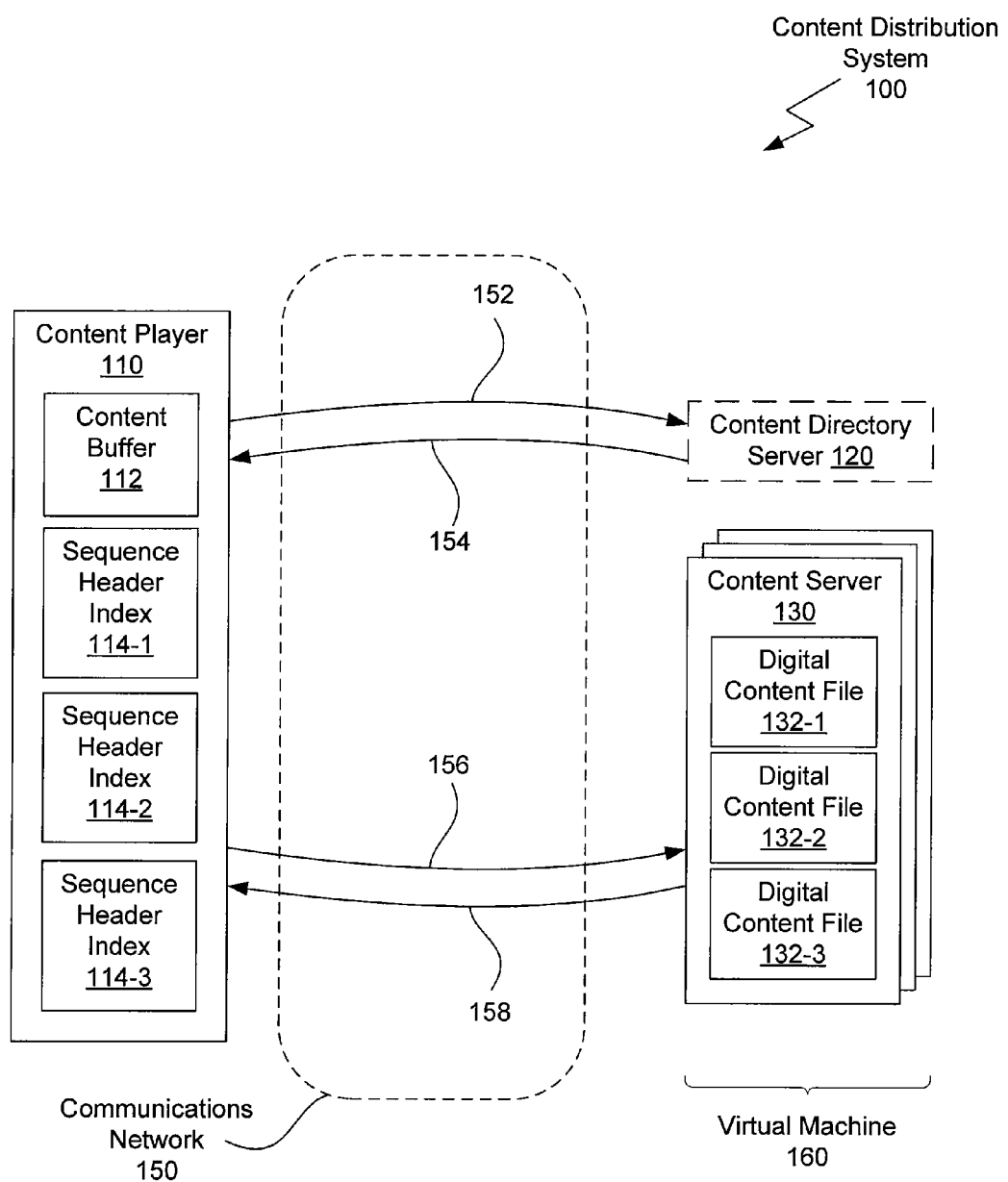
FIG. 1 illustrates a content distribution system according to one embodiment of the invention.

FIG. 1 illustrates a content distribution system 100 according to one embodiment of the invention. As shown, the content distribution system 100 includes, without limitation, a content player 110, one or more content servers 130, and a communications network 150. The content distribution system 100 may also include a content directory server 120.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network.

The content directory server 120 is configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110. In alternative embodiments, if the content server 130 may be configured to also act as the content directory server 120.

The content server 130 is configured to serve download requests made by the content player 110 for digital content files 132. The digital content files may reside on a mass storage system accessible to the content server 130. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2 and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, each time slot within the digital content file 132-1 comprising an encoded sequence encoded to a playback bit rate of 1500 Kbps would include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

The foregoing describes an implementation that enables the content player 110 to play digital content files 132 streamed from the content server 130. Such an implementation assumes that the content player 110 and the content server 130 each operate under a set of standards that enable proper streaming and playback of the digital content files 132 between the content server 130 and the content player 110.

Figure 4:
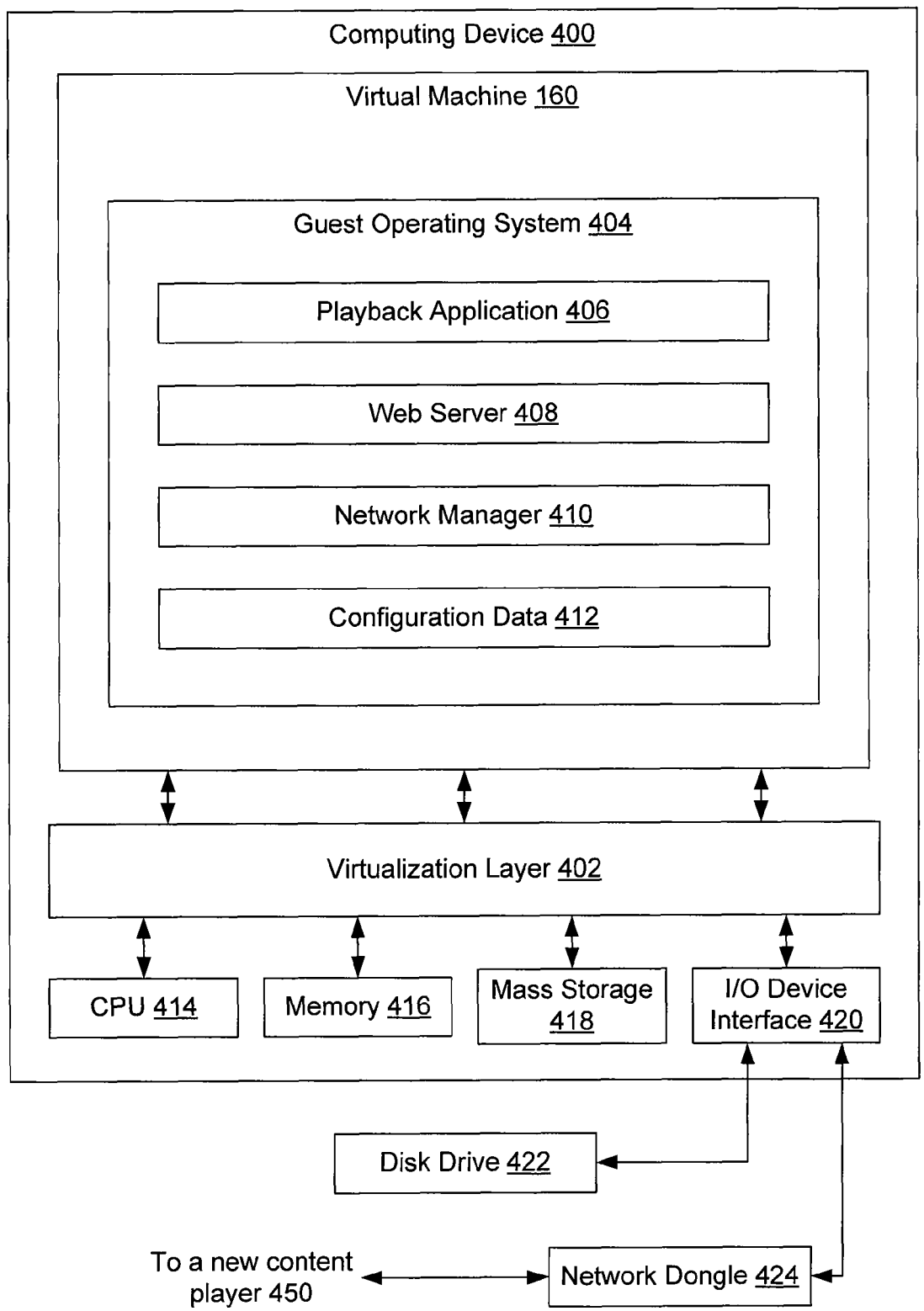
FIG. 4 illustrates a content player testing apparatus, according to one embodiment of the invention.

As a result, manufacturers of a new content player, i.e. the new content player 450 in FIG. 4, are required to ensure that the new content player 450 is compatible with the set of standards before distributing the new content player 450 to consumers. To ensure such compatibility, the new content player 450 undergoes a series of tests. For example, if one standard requires that the new content player 450 is able to, without delay and/or error, fast-forward or rewind playback of digital content files 132, then an appropriate test comprises measuring processor loads of and/or memory levels in the new content player 450 while the fast-forward and rewind playback of digital content files 132 occurs.

To provide a technique that fully tests the new content player 450, embodiments of the invention provide a virtual machine (VM) 160 that, when executed on a computing device, emulates, at least in part, the functionality of the content server 130. This technique is described in further detail below in conjunction with FIG. 4.

Figure 2:
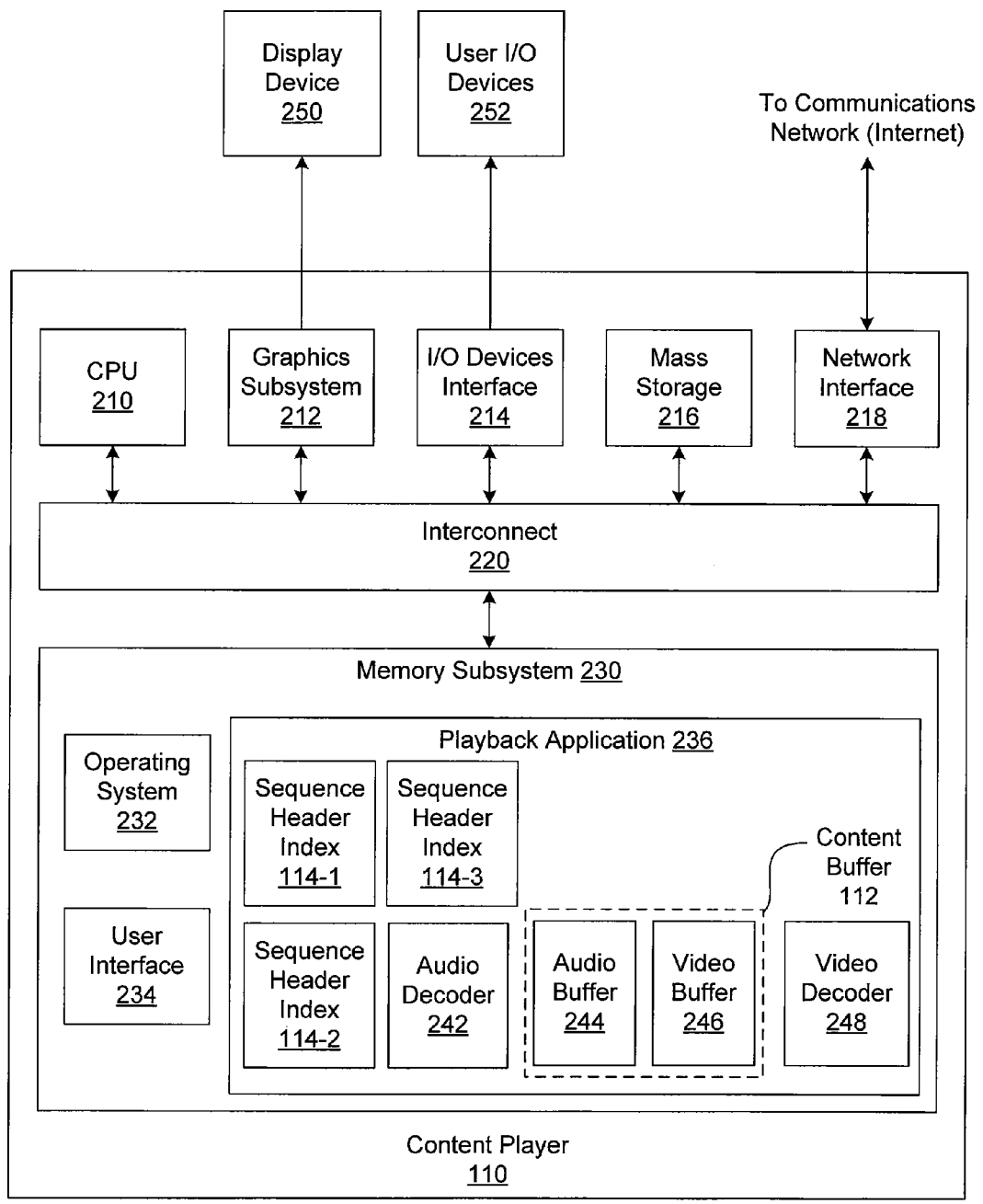
FIG. 2 is a more detailed view of the content player of FIG. 1, according to one embodiment of the invention.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system (OS) 232, user interface 234, and playback application 236. The OS 232 performs system management functions such as managing hardware devices including the network interface 218, mass storage unit 216, I/O device interface 214, and graphics subsystem 212. The OS 232 also provides process and memory management models for the user interface 234 and the playback application 236. The user interface 234 provides a specific structure, such as a window and object metaphor, for user interaction with content player 110. Persons skilled in the art will recognize the various OSs and user interfaces that are well-known in the art and suitable for incorporation into the content player 110.

The playback application 236 is configured to retrieve a digital content file 132 from a content server 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130. A sequence header index 114 associated with digital content file 132, described in greater detail in FIG. 4, includes information related to the encoded sequence included in the digital content file 132.

In one embodiment, the playback application 236 begins downloading the digital content file 132 associated with the requested title comprising the encoded sequence encoded to the lowest playback bit rate to minimize startup time for playback. For the purposes of discussion only, the digital content file 132-1 is associated with the requested title and comprises the encoded sequence encoded to the lowest playback bit rate. The requested digital content file 132-1 is downloaded into the content buffer 112, configured to server as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
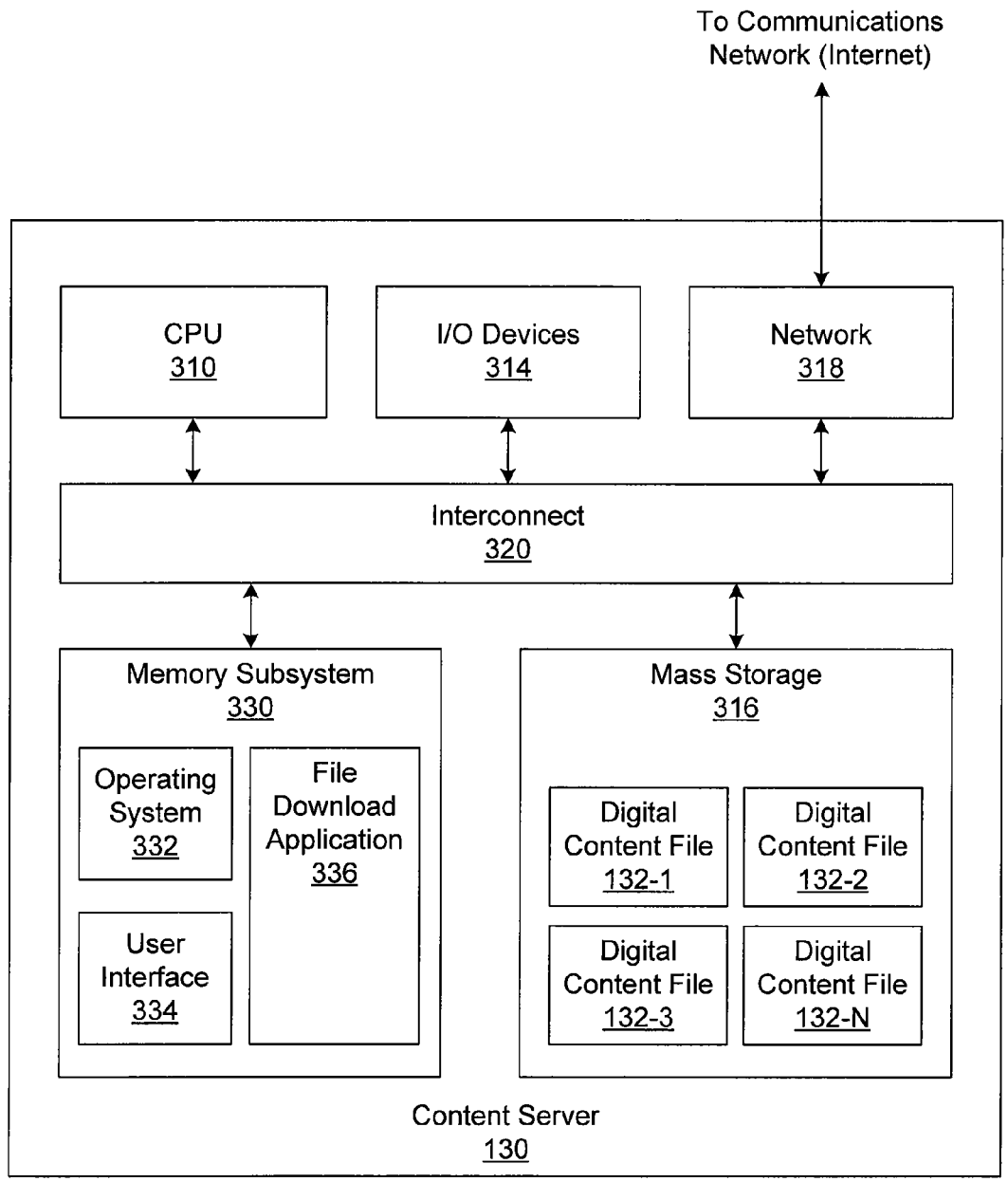
FIG. 3 is a more detailed view of the content server of FIG. 1, according to one embodiment of the invention.

FIG. 3 is a detailed view of the content server 130 of FIG. 1, according to one embodiment of the invention. As previously described, the functionality of the content server 130 described below is emulated, at least in part, by the virtual machine 160. As shown, the content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an OS 332, a user interface 334, and a file download application 336. The OS 332 performs system management functions such as managing hardware devices including the network interface 318, mass storage unit 316, and I/O devices interface 314. The OS 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various OSs and user interfaces that are well-known in the art and suitable for incorporation into the content player 130.

The file download application 336 is configured to facilitate transfer of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence (known in the art as "random access"). As previously described herein, each digital content file 132 includes a sequence header index 114 and an encoded sequence. An encoded sequence comprises a full version of a given movie or song encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

FIG. 4 illustrates a content player testing apparatus, according to one embodiment of the invention. Here, a computing device 400 is configured to execute the virtual machine 160. Specifically, the computing device 400 provides a virtualization layer that abstracts processor, memory, storage, and/or networking resources into the virtual machine 160. The computing device 400 includes all conventional components of a computing device, such as a desktop computer, a laptop computer, a blade server, or the like. As shown, the virtual machine 160 executes on the computing device 400 and shares hardware resources of the computing device 400, including a CPU 414, a memory 416, a mass storage system 418, and I/O device interface 420.

The virtual machine 160 runs on top of virtualization layer 402, which is a software interface layer that enables sharing of the hardware resources of computing device 400 by the virtual machine 160. Virtualized layer 402 may run on top of the OS of the computing device 400 (e.g., Microsoft Windows® executing VMWare Studio™) or directly on hardware components of the computing device 400 (e.g., using VMWare ESXi™). The virtual machine 160 includes a guest OS 404, e.g., Ubuntu 8.04 Linux OS, where the guest OS 404 executes one or more guest applications. The guest OS 404 is a master control program of the virtual machine 160 and, among other things, the guest OS 404 forms a software platform on top of which the guest applications run.

As shown, such guest applications include a playback application 406 which provides functionality similar to the playback application 236 described above in conjunction with FIG. 3. The guest applications also include a web server 408 that is configured to provide the same functionality as the content server 130 described above, i.e., to serve download requests made by the new content player 450 for digital content files 132. The guest applications also include a network manager 410 which is used to control network communications between computing device 400 and the new content player 450. Specifically, the network manager 410 is able to, when required, throttle the speed of the typically fast local network connection (e.g., 10/100 Mbps LAN) between the computing device 400 and the new content player 450 to simulate speeds comparable to those typically found when using an internet connection (e.g., 1.5 Mbps).

In addition, the configuration data 412 is included and referenced by both the web server 408 and the network manager 410 when testing the new content player 450. For example, the configuration file may include, but is not limited to, a specification of a complete list of tests to be executed on the new content player 450 (e.g., video playback tests, audio playback tests, subtitle tests, memory management tests, etc.), and network configuration settings for the network manager 410 (e.g., port configuration settings, maximum data transfer rates, etc.). Configuration data 412 may also include firmware update tests and software update tests that determine whether the new content player 450 is able to appropriately load updates mandated by the content server 130 with which the new content player 450 will eventually interact (i.e., after the new content player 450 has been tested).

In order for the computing device 400 to provide digital content files 132 to the new content player 450, in one embodiment, an external disk drive 422 is connected to the computing device 400 via the I/O device interface 420, where the external disk drive 422 is preloaded with a plurality of digital content files 132. Similarly, in order for the computing device 400 to communicate with the new content player 450, a network dongle 424 is connected to the computing device 400, where the network dongle 424 is, e.g., a local area network (LAN) device or a wireless networking device. In one embodiment, the virtual machine 160 is configured to automatically recognize and interact with both the disk drive 422 and the network dongle 424 when each is connected to the computing device 400 so that no user configuration of or installation of drivers on the computing device 400 is required. However, both the disk drive 422 and the network dongle 424 are used to ease the configuration process of computing device 400 and are not required by embodiments of the invention.

More specifically, in lieu of the external disk drive 422, a user may receive a digital versatile disk (DVD) that is readable by a disk drive (not shown) included in the computing device 400 that stores a plurality of digital content files 132. Similarly, in lieu of the network dongle 424, the computing device 400 may include a generic Network Interface Card (NIC) (not shown) that is accessible to the virtual machine 160 via the virtualization layer 402.

The computing device 400 executes the virtual machine 160 which is configured to cause a comprehensive series of tests to be executed on the new content player 450. In one embodiment, the virtual machine 160 is configured to detect the connection between the computing device 400 and the new content player 450 and, in response, cause the tests to automatically be executed on the new content player 450. In another embodiment, the user may choose a subset of the tests via a configuration page viewable on, e.g., a display device (not shown) connected to the computing device 400, as described below in conjunction with FIG. 5.

Figure 5:
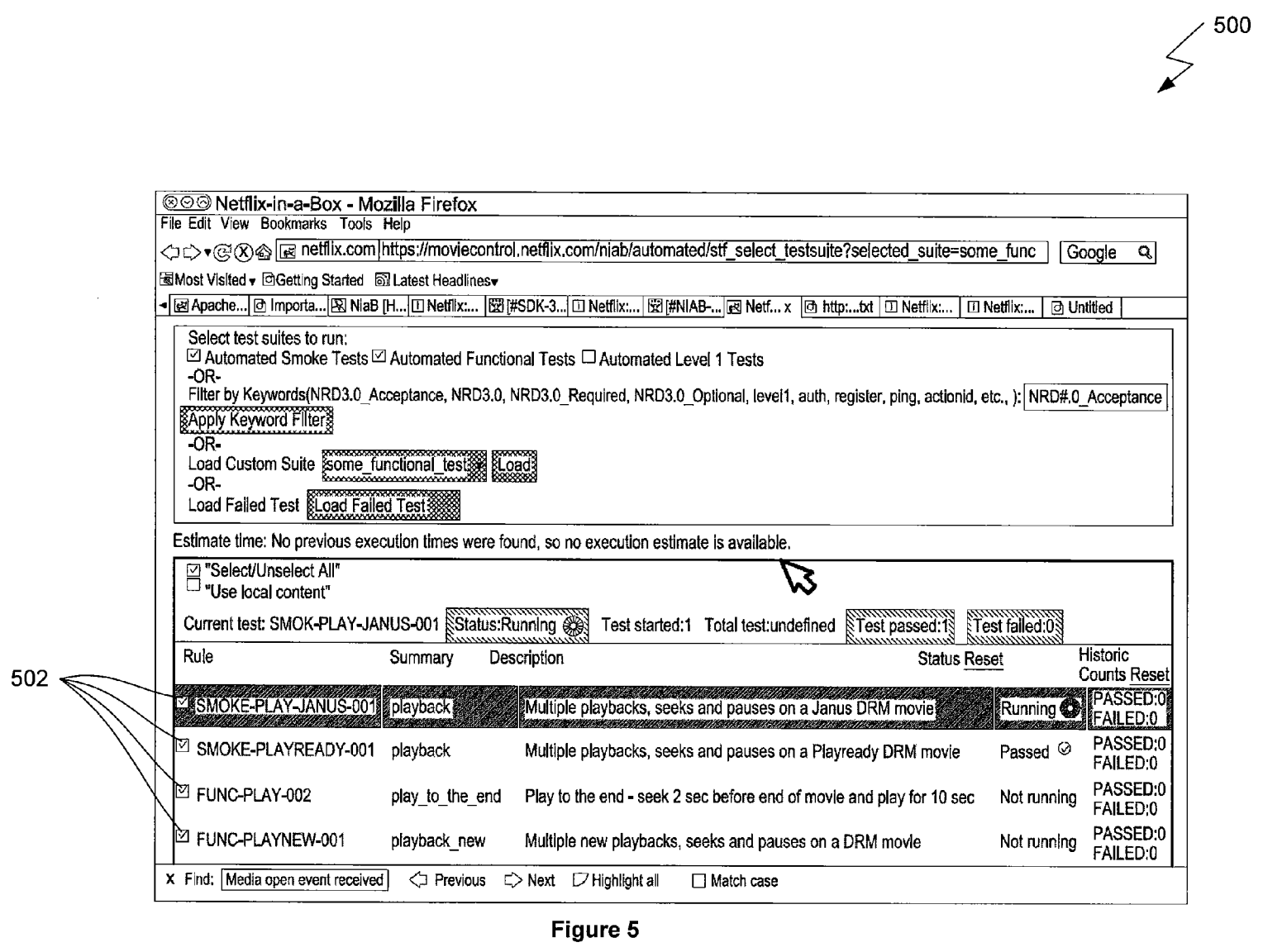

FIG. 5 illustrates a content player testing configuration interface, according to one embodiment of the invention. As shown, an interface 500 is accessible via a web browser, where the interface 500 is hosted by the web server 408. A user is able to select one or more tests to be undergone by the new content player 450. For example, the user may check or uncheck each of the checkboxes 502 to cause all or a subset of the tests to be transmitted to the new content player 450. Optionally, the tests may be organized hierarchically into categories, where each category is nestable and may include any number of tests. For example, one category may be titled "video playback" and include all tests associated with exercising the playback capabilities of the new content player 450. When the appropriate tests are selected by the user, he or she is able to cause the selected tests to be executed via a link or button included within the interface 500. Advantageously, the user is able to save time and resources by focusing testing of the new content player 450 only into areas that require improvement.

Additionally, users are able to search for tests based on keywords input to the interface 500 by the user. Further, a summarization of testing progress and or test results may be included in the interface 500, thereby providing to the user a convenient overview of the present capabilities of the new content player 450.

Figure 6:
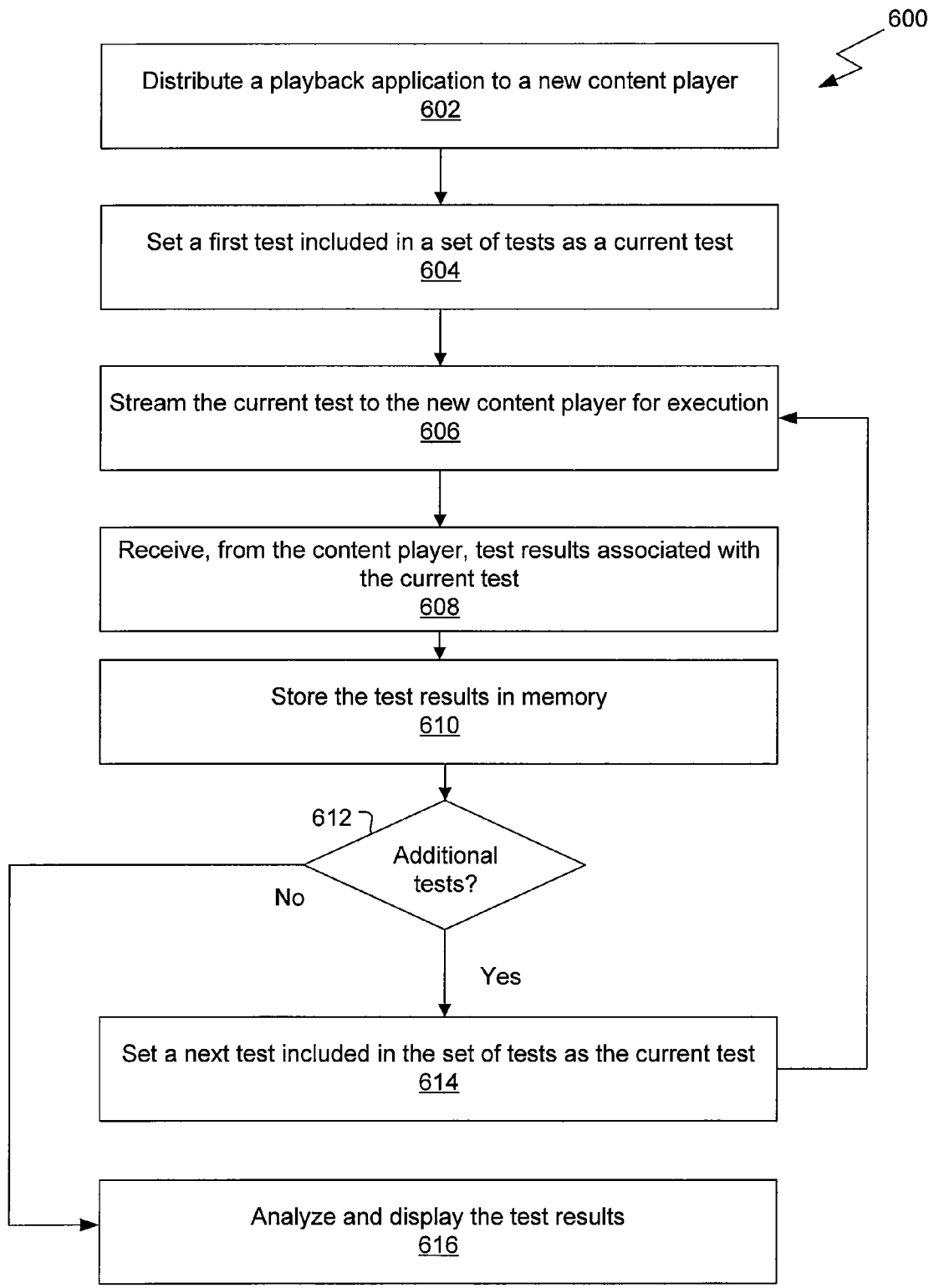
FIG. 6 is a flow diagram of method steps for testing a content player, according to one embodiment of the invention.

FIG. 6 is a flow diagram of method steps 600 for testing the new content player 450, according to one embodiment of the invention. Although the method steps are described in conjunction with the systems of FIGS. 1-5, persons skilled in the art will understand that any system configured to perform the method steps, in any order, is within the scope of the inventions.

As shown, the method begins at step 602, where the virtual machine 160 distributes the playback application 406 to the new content player 450. Accordingly, the new content player 450 receives the playback application 406 via the network dongle 424 and stores the playback application 406 in the memory subsystem 230 described above in FIG. 2. Upon receipt of the playback application 406, the new content player 450 executes the playback application 406 and indicates readiness to the virtual machine 160 to undergo one or more tests.

At step 604, the virtual machine 160 sets a first test included in a set of tests as a current test. As previously described herein, the virtual machine 160 references the configuration data 412 to determine this set of tests. At step 606, the virtual machine 160 streams the current test to the new content player 450 for execution. Specifically, the current test includes instructions that are executable by the new content player 450 and cause the new content player 450 to perform a particular operation. Here, the particular operation, if executed properly by the new content player 450, indicates that the new content player 450 is at least partially compatible with the set of standards previously described herein. For example, the current test may include instructions that cause the new content player 450 to display a set of subtitles in a plurality of languages. In another example, the current test causes the new content player 450 to fast-forward playback of a digital content file 132 at 2× speed, 10× speed, and 30× speed.

To determine whether the tests are executed properly by the new content player 450, the instructions included in each test also cause the content player 110 to monitor one or properties associated with the test while being executed. For example, with respect to testing fast-forwarding of playback of a digital content file 132, the new content player 450 may store a first current playback timestamp of the digital content file 132, e.g. "1 hr:37 min:03 sec", fast-forward the playback of the movie at 10× speed for five seconds (i.e., fifty seconds total forward advancement of playback), and then store a second current playback timestamp of the digital content file 132. The new content player 450 then routes this information back to the virtual machine 160 as test results that are associated with the current test.

At step 608, the virtual machine 160 receives, from the content player, the test results associated with the current test. Continuing with the fast-forward example set forth above, to determine whether the new content player 450 passed the test, the virtual machine 160 subtracts the second playback timestamp from the first playback timestamp, which is then compared to an expected time difference of fifty seconds. Accordingly, the virtual machine 160 is able to effectively determine whether the new content player 450 is compatible with fast-forward playback standards.

At step 610, the virtual machine 160 stores the test results in memory. At step 612, the virtual machine 160 determines whether additional tests are included in the set of tests. If, at step 612, the virtual machine 160 determines that additional tests are included in the set of tests, then, at step 614, the virtual machine 160 sets a next test included in the set of tests as the current test. The method steps 606-614 are repeated until each and every test included in the set of tests has been executed on the new content player 450.

At step 616, the virtual machine 160 analyzes and displays the test results. The test results may be analyzed and displayed by, e.g., parsing the results and generating an output text file, parsing the results and generating a hypertext markup language (HTML) file, and/or parsing the results and generating an extended markup language (XML) file. The virtual machine 160 may also be configured to data-mine the test results in order to identify causes of failed tests that would otherwise be non-obvious to the user when reading e.g. the output text file.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for testing a client for audio/video playback and network capabilities, the method comprising:
    instantiating a virtual machine using a virtual machine data file, wherein the virtual machine includes an operating system, a web server, a content playback application, a network management application, and a test program, wherein the network management application is configured to limit network bandwidth between the web server and the client, and wherein the test program is configured with a plurality of tests for testing the client;
    transmitting, to the client via the web server:
        the content playback application for execution, and
        two or more of the plurality of tests, wherein a first test of the two or more tests includes a first playback operation, the first playback operation comprising at least one of a fast-forward operation and a rewind operation;
    while the client is executing the two or more tests, limiting, by the network management application, the network bandwidth between the web server and the client to a first amount of bandwidth;
    receiving, from the client via the web server, test results corresponding to the two or more tests, wherein the test results include a first timestamp corresponding to the beginning of the first playback operation and a second timestamp corresponding to the end of the first playback operation; and
    parsing the test results to generate a test report indicating whether each of the two or more tests completed successfully, wherein success of the first test is determined by comparing the difference between the first timestamp and the second timestamp to an expected amount of time.

2. The method of claim 1, further comprising:
    presenting, by the test program, an interface depicting the plurality of tests; and
    receiving a user selection of the two or more tests from the presented interface.

3. The method of claim 1, wherein the network management application is configured to limit the network bandwidth between the web server and the client to the first amount of bandwidth during a first one of the two or more tests, and is further configured to limit the network bandwidth between the web server and the client to a second amount of bandwidth during a second one of the two or more tests, wherein the second amount of bandwidth is distinct from the first amount of bandwidth.

4. The method of claim 1, wherein the communications connection to the client is provided by a networking device with which the operating system is configured to automatically interact.

5. The method of claim 1, wherein transmitting the two or more tests to the client further comprises transmitting two or more digital audio/video content files to the client.

6. The method of claim 5, wherein the two or more digital audio/video content files are included in an external storage device with which the operating system is configured to automatically interact.

7. The method of claim 1, further comprising:
    presenting, by the test program, an interface depicting the test report.

8. A non-transitory computer-readable medium storing instructions that, when executed by a processor, cause the processor to test a client for audio/video playback capabilities, by performing an operation comprising:
    instantiating a virtual machine using a virtual machine data file, wherein the virtual machine includes an operating system, a web server, a content playback application, a network management application, and a test program, wherein the network management application is configured to limit network bandwidth between the web server and the client, and wherein the test program is configured with a plurality of tests for testing the client;
    transmitting, to the client via the web server:
        the content playback application for execution, and
        two or more of the plurality of tests, wherein a first test of the two or more tests includes a first playback operation, the first playback operation comprising at least one of a fast-forward operation and a rewind operation;
    while the client is executing the two or more tests, limiting, by the network management application, the network bandwidth between the web server and the client to a first amount of bandwidth;
    receiving, from the client via the web server, test results corresponding to the two or more tests, wherein the test results include a first timestamp corresponding to the beginning of the first playback operation and a second timestamp corresponding to the end of the first playback operation; and
    parsing the test results to generate a test report indicating whether each of the two or more tests completed successfully, wherein success of the first test is determined by comparing the difference between the first timestamp and the second timestamp to an expected amount of time.

9. The non-transitory computer-readable medium of claim 8, further comprising:
    presenting, by the test program, an interface depicting the plurality of tests; and
    receiving a user selection of the two or more tests from the presented interface.

10. The non-transitory computer-readable medium of claim 8, wherein the network control and management application is configured to limit the network bandwidth between the web server and the client to the first amount of bandwidth during a first one of the two or more tests, and is further configured to limit the network bandwidth between the web server and the client to a second amount of bandwidth during a second one of the two or more tests, wherein the second amount of bandwidth is distinct from the first amount of bandwidth.

11. The non-transitory computer-readable medium of claim 8, wherein the communications connection to the client is provided by a networking device with which the operating system is configured to automatically interact.

12. The non-transitory computer-readable medium of claim 8, wherein transmitting the two or more tests to the client further comprises transmitting two or more digital audio/video content files to the client.

13. The non-transitory computer-readable medium of claim 12, wherein the two or more digital audio/video content files are included in an external storage device with which the operating system is configured to automatically interact.

14. The non-transitory computer-readable medium of claim 8, further comprising:
    presenting, by the test program, an interface depicting the test report.

15. A computer system, comprising:
a processor; and
a memory storing instructions that when executed by the processor are configured to perform an operation comprising:
- instantiating a virtual machine using a virtual machine data file, wherein the virtual machine includes an operating system, a web server, a content playback application, a network management application, and a test program, wherein the network management application is configured to limit network bandwidth between the web server and the client, and wherein the test program is configured with a plurality of tests for testing the client;
- transmitting, to the client via the web server:
  - the content playback application for execution, and
  - two or more of the plurality of tests, wherein a first test of the two or more tests includes a first playback operation, the first playback operation comprising at least one of a fast-forward operation and a rewind operation;
- while the client is executing the two or more tests, limiting, by the network management application, the network bandwidth between the web server and the client to a first amount of bandwidth;
- receiving, from the client via the web server, test results corresponding to the two or more tests, wherein the test results include a first timestamp corresponding to the beginning of the first playback operation and a second timestamp corresponding to the end of the first playback operation; and
- parsing the test results to generate a test report indicating whether each of the two or more tests completed successfully, wherein success of the first test is determined by comparing the difference between the first timestamp and the second timestamp to an expected amount of time.

16. The computer system of claim 15, the operation further comprising:
- presenting, by the test program, an interface depicting the plurality of tests; and
- receiving a user selection of the two or more tests from the presented interface.

17. The computer system of claim 15, wherein the network management application is configured to limit the network bandwidth between the web server and the client to the first amount of bandwidth during a first one of the two or more tests, and is further configured to limit the network bandwidth between the web server and the client to a second amount of bandwidth during a second one of the two or more tests, wherein the second amount of bandwidth is distinct from the first amount of bandwidth.

18. The computer system of claim 15, wherein the communications connection to the client is provided by a networking device with which the operating system is configured to automatically interact.

19. The computer system of claim 15, wherein transmitting the two or more tests to the client further comprises transmitting two or more digital audio/video content files to the client.

20. The computer system of claim 15, the operation further comprising:
- presenting, by the test program, an interface depicting the test report.

* * * * *